United States Patent [19]

Questel et al.

[11] Patent Number: 4,803,795
[45] Date of Patent: Feb. 14, 1989

[54] HOME ORGANIZER

[76] Inventors: Roger Questel, 136 E. 74th St., New York, N.Y. 10021; Gene P. Seidman, 33 Riverside Dr., Apt. 9FA, New York, N.Y. 10023

[21] Appl. No.: 84,134

[22] Filed: Aug. 12, 1987

[51] Int. Cl.$^4$ .............................................. G09F 1/10
[52] U.S. Cl. .................................. 40/124.2; 40/124.4; 40/360; 40/405; 402/79
[58] Field of Search .................... 40/124, 124.2, 124.4, 40/359, 360, 107, 120–122, 537, 405, 391, 393, 395, 396, 397; 281/38; 402/79, 500

[56] References Cited

U.S. PATENT DOCUMENTS

| | | | |
|---|---|---|---|
| 1,614,021 | 1/1927 | Sprenger | 40/360 |
| 1,676,492 | 7/1928 | Goodwin | 40/124.4 |
| 1,695,328 | 12/1928 | Gordon et al. | 40/405 |
| 1,733,304 | 10/1929 | Hutchings | 40/397 |
| 1,767,257 | 6/1930 | Rand | 40/360 |
| 1,802,293 | 4/1931 | Von Auw | 40/397 |
| 2,110,095 | 3/1938 | Schmid | 40/397 |
| 2,959,879 | 11/1960 | Mazur | 40/124.4 |
| 3,073,050 | 1/1963 | Dubois | 40/124.4 |
| 3,651,591 | 3/1972 | Woodyard | 40/537 |
| 4,065,864 | 1/1978 | Stanley | 40/405 |
| 4,419,837 | 12/1983 | Meeker | 40/124.4 |
| 4,571,867 | 2/1986 | Williams | 40/124.4 |

FOREIGN PATENT DOCUMENTS

| | | | |
|---|---|---|---|
| 810870 | 6/1951 | Fed. Rep. of Germany | 40/391 |
| 1216841 | 5/1966 | Fed. Rep. of Germany | 40/405 |

Primary Examiner—Robert Peshock
Assistant Examiner—Michael Lynch
Attorney, Agent, or Firm—Michael Ebert

[57] ABSTRACT

A home organizer adapted to store in readily retrievable form monthly receipts such as telephone bill receipts. The organizer, which has a full year capacity for these receipts, is constituted by a panel formed by superposed front and rear plies, each having an end pocket. Die cut in each ply adjacent the pocket is a transverse array of six crescents which create parallel slots therein. Marked near the face of the front ply pocket in registration with the slots are the names of the first six months of a given year, and similarly marked on the face of the rear ply pocket are the names of the last six months. Receipts for the different months are stored in the slots assigned to these months, the lower edge of each receipt being inserted in the slot and the leading end of the receipt being received in the end pocket, thereby retaining the receipt at its assigned position. When all slots in the array are occupied, the receipts then lie in overlapping relation, and any receipt may thereafter be removed from its slot without disturbing the others.

7 Claims, 3 Drawing Sheets

U.S. Patent  Feb. 14, 1989  4,803,795
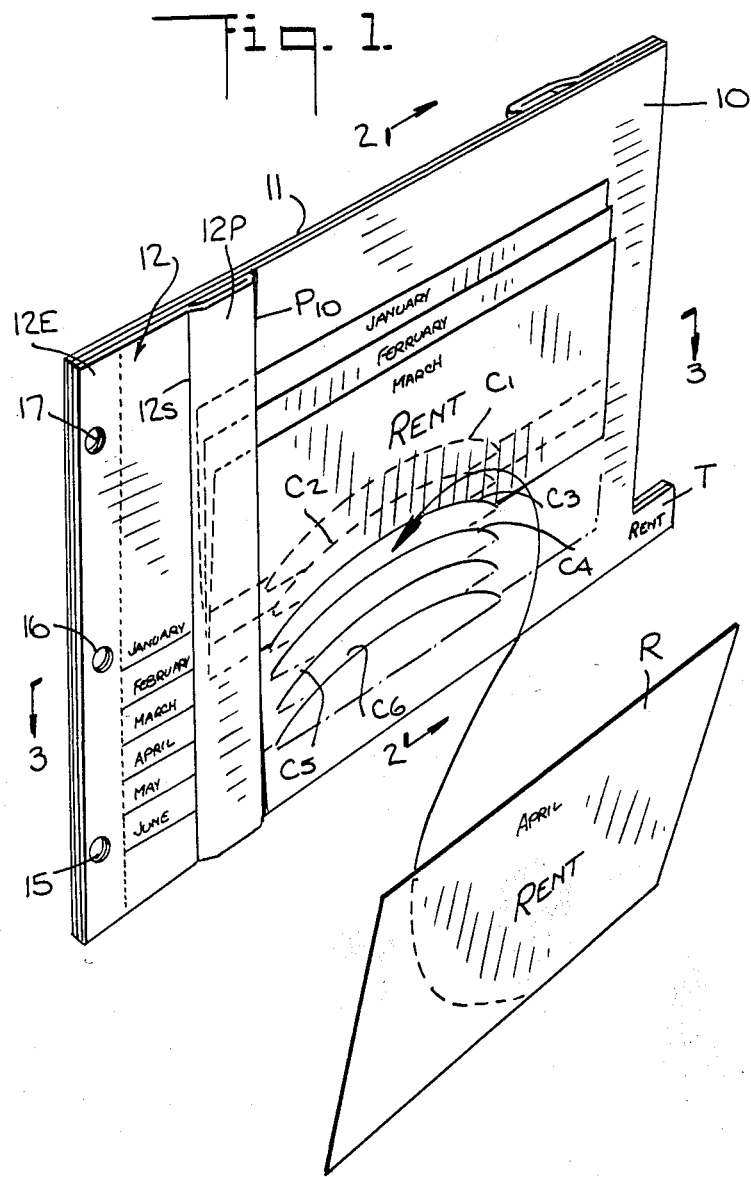
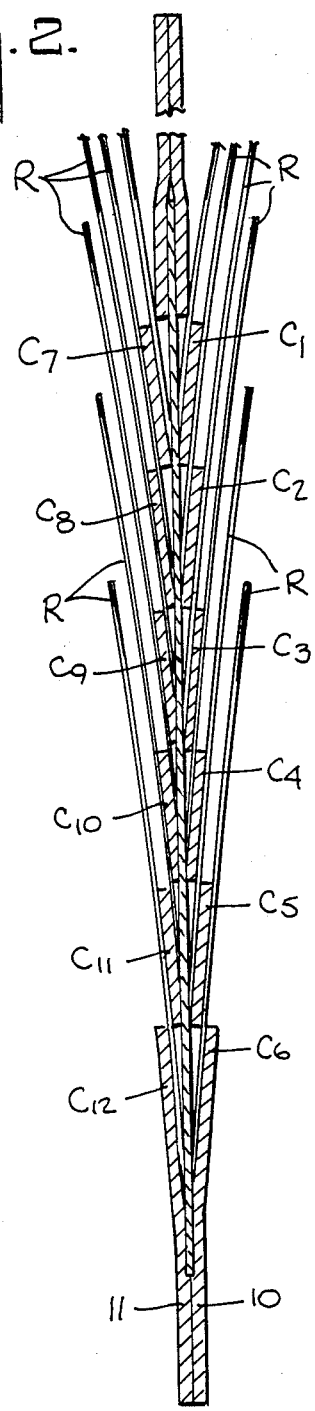
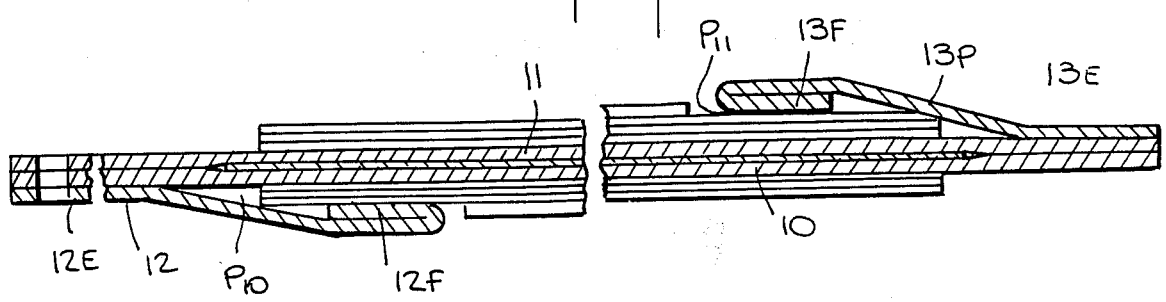

HOME ORGANIZER

BACKGROUND OF INVENTION

1. Field of Invention

This invention relates generally to organizers for storing cards, sheets and the like, and more particularly to a home organizer for storing monthly receipts and constituted by a two-ply panel, the front ply being adapted to store monthly receipts for the first six months of a given year, the rear ply being reserved for receipts for the last six months.

2. Status of Prior Art

The typical householder receives bills every month of the year from diverse sources, such as telephone and utility bills, mortgage payment bills and bills from credit card companies. These monthly bills are accompanied by a receipt which is filled out by the householder to indicate when a payment is made and its amount, the receipt being retained by the householder as his record of payment.

It is important for the householder to store these receipts so that he can keep track of all payments for income tax and other purposes. This is not an easy matter; for in the course of each year the householder will normally accumulate a large volume of receipts for various services rendered. Should the householder simply dump these monthly receipts in a storage box, a not uncommon practice, it becomes difficult for him to retrieve a particular receipt from the unassorted pile thereof. Thus if a question arose as to whether a payment had been made to the telephone company in July, the householder would then have to rifle through the pile to retrieve the appropriate receipt. And if the householder wishes to total his respective payments for the year for telephone, utility and other services, he must then sort out the various receipts.

A better organized way of storing receipts is to place all monthly receipts from one source, such as the telephone company, in a letter folder; those from another source, say, an electric utility, in a separate folder, and so on. But this practice also has distinct drawbacks; for loose receipts in a letter folder can fall out and be lost. Moreover, when looking for a receipt for a particular month, one has to search for this receipt among those in the folder.

A more efficient way of storing receipts is to use a multi-pocket accordian folder in which telephone receipts go in one pocket, electric utility receipts in another, etc. However, these stored receipts pile up at the bottom of the pockets and are not easily retrieved.

It is not enough to just store receipts accumulated over a year period, for it may become necessary to consult these receipts years later. Hence the need exists not only for an organizer capable of storing monthly receipts accumulated over a given year, but one which also lends itself to long term storage.

Various attempts have heretofore been made to provide organizers for storing cards, papers and other documents in a manner that facilitates reference to the stored documents and makes it easier to retrieve them when necessary. Thus the patent to Bell, U.S. Pat. No. 4,055,008, shows a book for storing monthly bank checks, each page of which is provided with several open pockets to store the checks; the checks for January being held in one pocket, those for February in another, etc. The Dubois patent U.S. Pat. No. 3,073,050 discloses a holder for index cards having V-shaped cutouts to receive the cards. Mazur, U.S. Pat. No. 2,959,879, provides a visible file having an array of cutouts for storing cards, while Williams, U.S. Pat. No. 4,571,876, provides a file having columns of parallel slits in a V-formation to receive memo cards. But none of these patents discloses a filing device specifically adapted to store monthly receipts in an organized manner.

SUMMARY OF INVENTION

In view of the foregoing, the main object of the invention is to provide an organizer constituted by a two-ply panel for storing monthly receipts, the receipts being so stored in the panel that they can readily be referred to or retrieved.

More particularly, an object of this invention is to provide a home organizer of the above type in which the stored receipts are in overlapping relation and can be separately seen to facilitate viewing and retrieval thereof.

Also an object of the invention is to provide organizer panels in a loose-leaf format, so that all of the panels in which the monthly receipts from a particular source are stored for a full year can be bound into a single loose-leaf folder, thereby making it possible for the householder to keep all his monthly receipts accumulated in a given year from various sources in a single place for easy reference. Or these panels may be stacked within a storage box for long term storage.

Yet another object of this invention is to provide an organizer that can be mass produced at low cost.

Briefly stated, these objects are attained in a home organizer adapted to store in readily retrievable form monthly receipts such as telephone bill receipts. The organizer, which has a full year capacity for these receipts, is constituted by a panel formed by superposed front and rear plies, each having an end pocket. Die cut in each ply adjacent the pocket is a transverse array of six crescents which create parallel slots therein. Marked near the face of the front ply pocket in registration with the slots are the names of the first six months of a given year, and similarly marked on the face of the rear ply pocket are the names of the last six months.

Receipts for the different months are stored in the slots assigned to these months, the lower edge of each receipt being inserted in the slot and the leading end of the receipt being received in the end pocket, thereby retaining the receipt at its assigned position. When all slots in the array are occupied, the receipts then lie in overlapping relation, and any receipt may thereafter be removed from its slot without disturbing the others.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a perspective view of an organizer in accordance with the invention;

FIG. 2 is a transverse section taken through the organizer in the plane indicated by line 2—2 in FIG. 1;

FIG. 3 is a longitudinal section taken through the organizer in the plane indicated by line 3—3 in FIG. 1;

DESCRIPTION OF INVENTION

Figure 4:
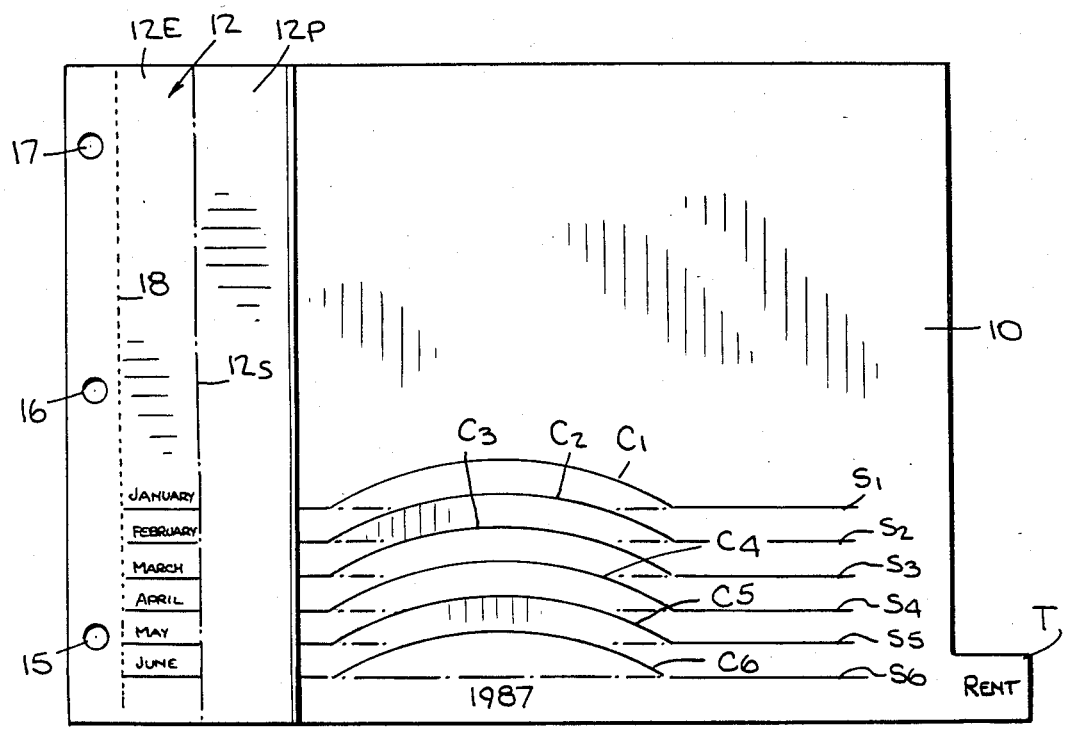
FIG. 4 shows the front ply of the organizer.

Referring now to FIGS. 1, 2 and 3, it will be seen that an organizer in accordance with the invention is constituted by a rectangular panel formed by superposed front and rear plies 10 and 11. These plies are made of relatively stiff sheet material such as 12 point paper cover stock or similar sheet material which is scored and die cut. In one actual embodiment of the panel, the dimensions thereof are 8½×11½ inches, but the organizer is by no means limited to these dimensions and may be made in other sizes. In practice, the panel may be formed of relatively stiff, synthetic plastic film.

Overlying one end of front ply 10 is a strip 12 divided by a transverse score line 12S into an end section 12E which is adhered to this ply and a pocket section 12P provided with a folded-in flap 12F which is free of the ply except at its upper and lower sides to define an end pocket $P_{10}$. Similarly, overlying rear ply 11 is a strip 13 having a score line which divides this strip into an end section 13E which is adhered to this ply and a pocket section 13P provided with a folded-in flap 13F to define an end pocket $P_{11}$. Pocket $P_{11}$ is at a position opposed to that of pocket $P_{10}$.

Figure 5:
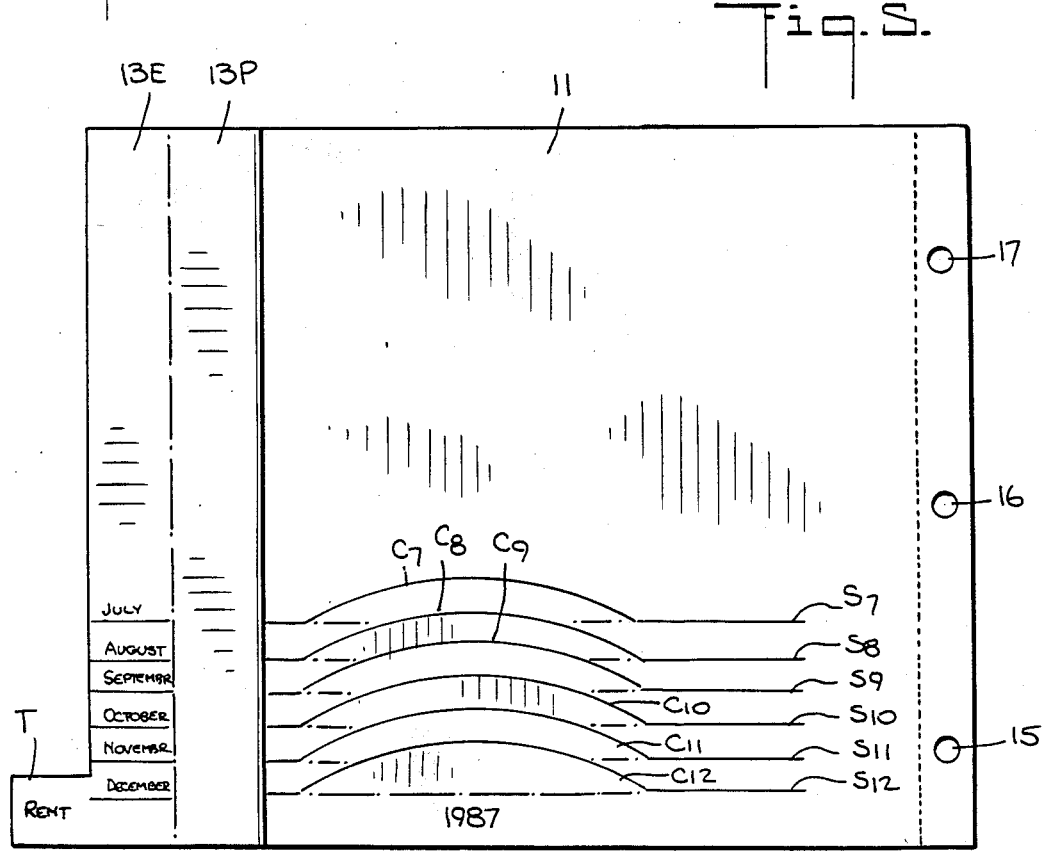
FIG. 5 shows the rear ply of the organizer.
Figure 6:
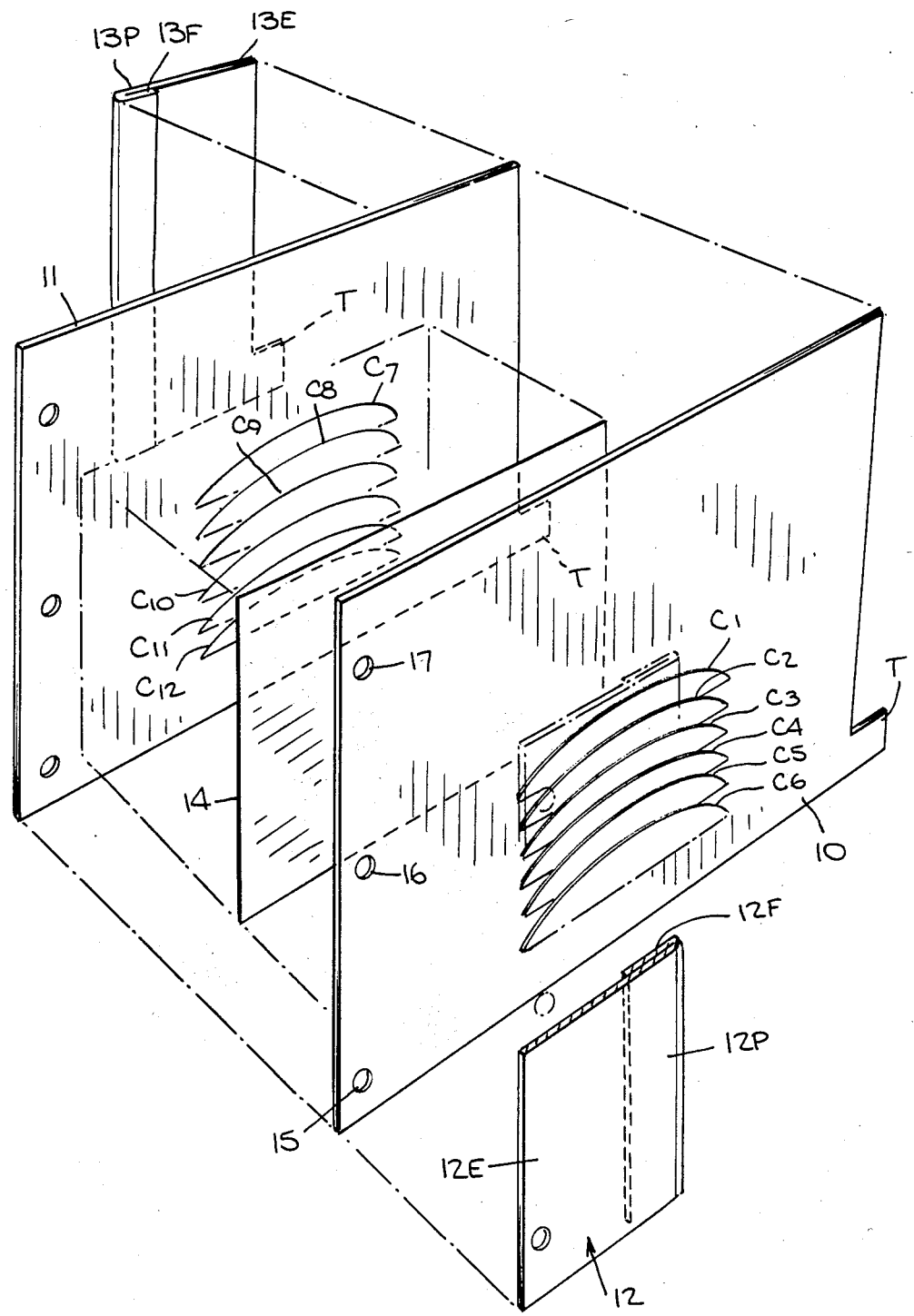
FIG. 6 is an exploded view of the organizer.

As best seen in FIG. 4, die cut in ply 10 by double cuts to provide distinct spaces thereon is a transverse array of six equi-spaced crescents $C_1$ to $C_6$, the lowest crescent being adjacent the lower edge of the ply and the peak of the uppermost crescent being about 3½ inches from this edge. These crescents define parallel slots in the ply whose positions are indicated by printed guide lines $S_1$ to $S_6$. Similarly die cut in ply 11, as shown in FIG. 5, are six crescents $C_7$ to $C_{12}$ to define parallel slots in the ply whose positions are indicated by printed guide lines $S_7$ to $S_{12}$. Sandwiched between plies 10 and 11, as best seen in FIG. 6, is a sheet 14 to provide a backing behind the crescents.

Printed or otherwise marked near the face of the end pocket of ply 10 in registration with guide lines $S_1$ to $S_6$ are the names of the first six months of a given year (1987), and printed near the face of the end pocket of ply 11 in registration with guide lines $S_7$ to $S_{12}$ are the names of the last six months of that year.

Each ply is provided at its lower corner opposed to the pocket end of the ply with an identifying tab T on which is printed, say, RENT, so that the organizer is then dedicated to rent receipts. Or the tab can be marked TEL for telephone bill receipts.

In order to load the organizer with monthly receipts R, the lower edge of each receipt is inserted into the slot assigned to the month for that receipt, the leading end of the receipt being received in the pocket, thereby securely retaining the receipt in place. Because the pocket is defined by a folded-in flap, this flap which seeks to unfold applies pressure against the receipt received in the pocket and acts to resist removal of the receipt therefrom. This action enhances the holding power of the pocket.

The various monthly receipts R held in the parallel slots of the organizer are in overlapping relation; hence one can see the upper margin of the receipt which usually identifies each month thereof. And one can also by grasping this upper margin easily remove the receipt from the organizer if it becomes necessary to inspect the receipt. Thus the receipts from the first six months of the year are held in front ply 10 and those for the last six months in the rear ply 11.

Each organizer stores receipts for a given year from a particular service. If, therefore, the household has receipts for mortgage or rent payments, telephone and utility payments, car loan payments, etc., he will for each set of receipts have a separate organizer for storing the respective receipts.

In order to keep all of these organizers together, the organizer is provided at one end thereof with spaced punch holes 15, 16 and 17 so that a group of organizers may be kept in a loose leaf folder having rings which go through the holes. Hence in a single folder one can retain all of the receipts from various sources for a given year. Or the householder may prefer for long term storage to put the organizers for a given year in a storage box. If one does not wish to use the organizer in loose-leaf form, a line of perforations 18 is provided, making it possible to tear off the margin containing punch holes and thereby reduce the size of the organizer so that it can fit in a standard letter size folder for storage in a file cabinet.

While there has been shown and described a preferred embodiment of a home organizer in accordance with the invention, it will be appreciated that many changes and modifications may be made therein without, however, departing from the essential spirit thereof. Thus the edge of the pocket may be scored so that this edge can be bent up slightly to facilitate entry of receipts into the pocket.

We claim:

1. A home organizer having a full year capacity constituted by a single rectangular panel adapted to store the monthly receipts for telephone bills or other billed services for which paper receipts are provided to indicate payment; said panel comprising superposed front and rear plies of relatively stiff sheet material each having an end pocket and a transverse array adjacent the end pocket of six like crescents die cut in the ply to define elongated, concentric, arcuate slots therein; a face of the end pocket of the front ply being marked in registration with the slots with the names of the first six months of the year and a face of the end pocket of the rear ply being similarly marked with the names of the last six months whereby a receipt for a given month in the year can be stored in the slot assigned to that month by inserting the lower edge of the receipt in the slot with the leading end of the receipt being received in the related end pocket to securely hold the receipt in place, the end pocket in the front ply being in a position opposed to that of the rear ply end pocket, the receipt being readily removed by its trailing end from the organizer, said slots being equi-spaced and the receipts held therein are therefore in overlapping relation to facilitate removal thereof.

2. A home organizer as set forth in claim 1, wherein each ply is provided with printed guide lines in registration with the slots.

3. A home organizer as set forth in claim 1, wherein said panel is provided with a series of holes at one end thereof, making it possible to keep the organizer in a loose-leaf folder.

4. An organizer as set forth in claim 1, wherein each ply is formed of paper cover stock.

5. An organizer as set forth in claim 1, further including a sheet sandwiched between the plies to provide a backing for the crescents.

6. An organizer as set forth in claim 1, wherein each pocket is formed by a strip overlying the end of the related ply, said strip being divided by a score line into an end section which is adhered to the ply and a pocket section.

7. An organizer as set forth in claim 6, wherein said pocket section is provided with a folded-in flap which applies pressure to the receipt received in the pocket.

* * * * *